C. P. STRITE.
VARIABLE SPEED PULLEY DRIVE.
APPLICATION FILED NOV. 12, 1908.
929,049.
Patented July 27, 1909.
2 SHEETS—SHEET 1.
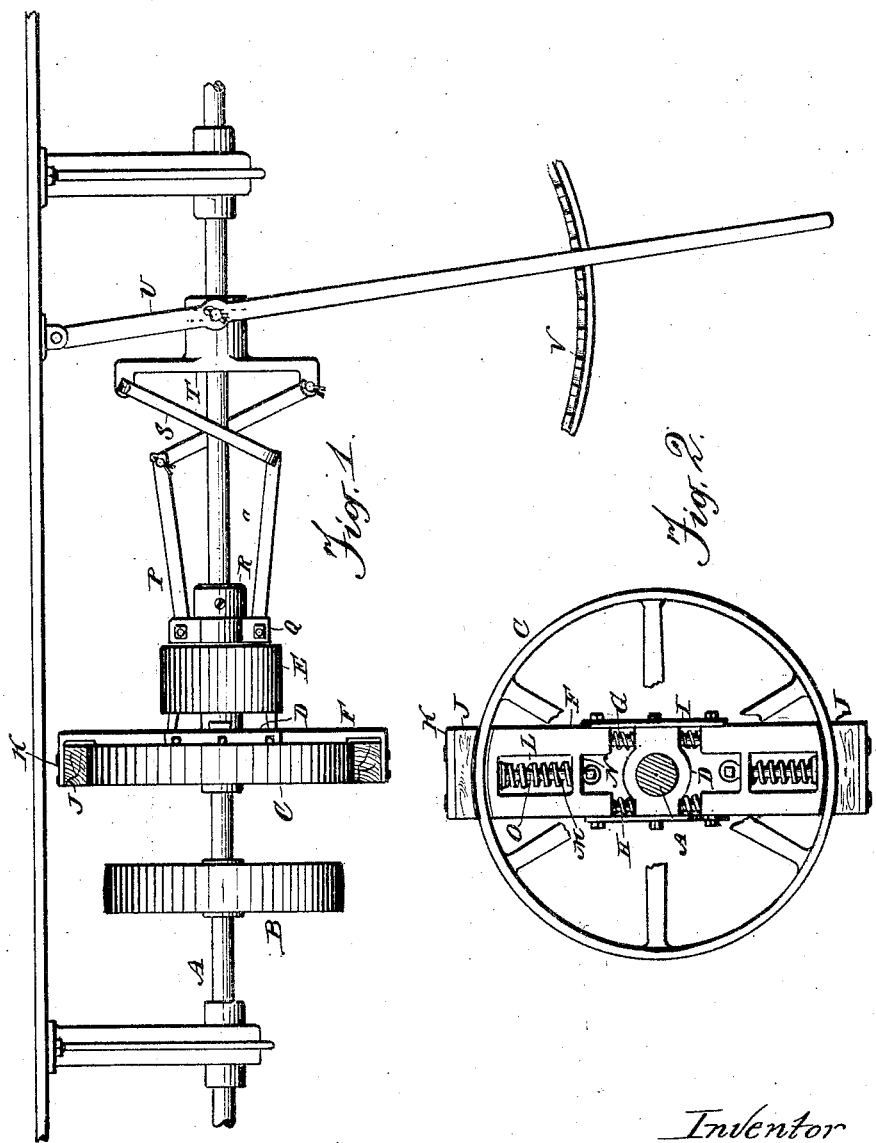
Witnesses:
L. A. St. John.
Robt. L. Zollinger.
Inventor
Charles P. Strite
By J. M. St. John,
Atty.

C. P. STRITE.
VARIABLE SPEED PULLEY DRIVE.
APPLICATION FILED NOV. 12, 1908.
929,049.
Patented July 27, 1909.
2 SHEETS—SHEET 2.
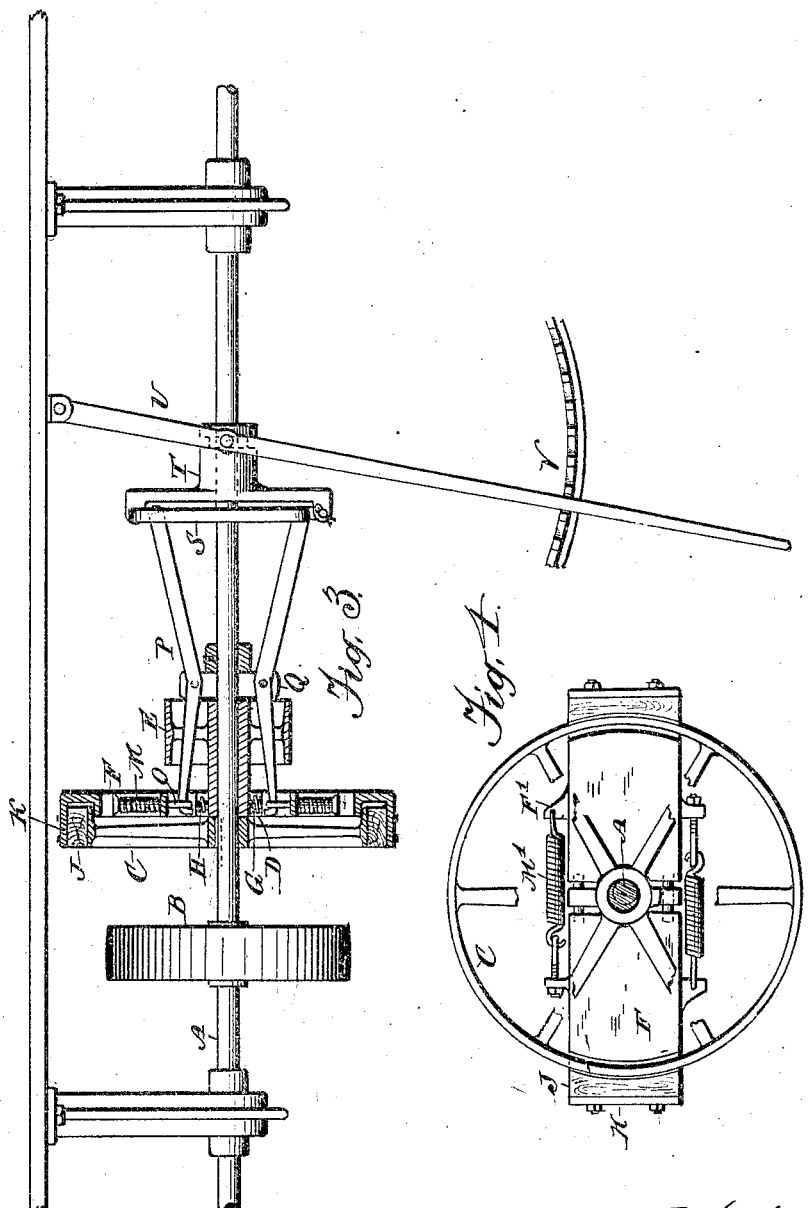

UNITED STATES PATENT OFFICE.

CHARLES P. STRITE, OF CEDAR RAPIDS, IOWA.

VARIABLE-SPEED PULLEY-DRIVE.

No. 929,049.

Specification of Letters Patent.

Patented July 27, 1909.

Application filed November 12, 1908. Serial No. 462,325.

*To all whom it may concern:*

Be it known that I, CHARLES P. STRITE, a citizen of the United States, residing at Cedar Rapids, in the county of Linn and State of Iowa, have invented certain new and useful Improvements in Variable-Speed Pulley-Drives, of which the following is a specification.

This invention relates to mechanism for the transmission of rotary motion, and has for its object to provide a driving pulley and connected controlling mechanism adapted to govern the speed of said driving pulley regardless of the speed of the shaft to which it is attached.

The nature of the invention is fully disclosed in the description and claims following, reference being had to the accompanying drawings, in which:—

Figure 1 is a front view of my improved driving apparatus, as in use. Fig. 2 is a face-view of the governing mechanism, as seen endwise of the shaft. Fig. 3 is similar to Fig. 1, but with the driving pulley and its governor in section. Fig. 4 is a face view of a modified form of the apparatus.

In the drawing A denotes a line or counter-shaft, to which a constant rotary motion is imparted by means of the pulley B. Fixed to the shaft is a friction pulley C, with its outer face turned true. Adjacent to this friction wheel is loosely mounted a spider D, the hub of which may be integral with the hub of the driving pulley E. The radial arms F of the spider are separate from the hub, and have a limited radial movement with respect to it. For this purpose the hub is provided with studs G fitting loosely into holes at the inner ends of said radial arms. Between these ends and the hub are compression springs H, tending to force the arms outwardly. Movement in this direction is limited by straps I bolted to the sides of the hub and to the arms, the terminal holes in the straps being a little larger than the bolts passing through them, so as to admit of the slight movement required to free the friction shoes J attached to the outer ends of the arms, from contact with the outer face of the friction pulley. In practice the shoes are concave blocks of hard wood suitably bolted to flanges K at the outer ends of the arms. In an opening L in each arm is mounted a compression spring M, one end bearing on a cross-bar N and the other on the nut of an eye-bolt O, the eye of which is at the opposite end. Engaging the eye of each eye-bolt is a lever P pivoted to a fulcrum yoke Q mounted to turn freely on the shaft, and held in place adjacent to the pulley hub by a collar R. The outwardly extending arms of these levers connect by toggle links S with the arms of a shifter sleeve T, also loosely mounted on the shaft. This may be shifted endwise of the shaft by an ordinary shift-lever U, held at any desired point by a notched sector V.

It is assumed that the shaft revolves at the highest required speed. This speed will be held by the driving pulley so long as the inward tension of the friction shoes is great enough to compensate for slippage due to work resistance and the centrifugal action of the heavy radial arms. To secure a lower rate of speed it is only necessary to move the shift-lever to the right, more or less. As will be evident, this relieves the tension of the compression springs, whereupon centrifugal force acts on the radial arms, and the friction device slips enough to reduce the speed to a point where all the forces are at equilibrium. In practice the revolution of the driving pulley is found to be very uniform at any speed within the range of the apparatus, and this range is as great as that of any ordinary iron-working lathe. The same principle is illustrated in Fig. 4, but in this case the required speed of the driving pulley (supposed to be behind the figure) can only be changed when the apparatus is at rest. The tension springs $M^1$ connect with external lugs $F^1$ and with eye-bolts which pass through similar lugs on the opposite arm. Greater or less tension, with corresponding speed, is of course attained by turning the nuts on the eyebolts. This type of driving apparatus is well suited to centrifugal machines, cream separators, and the like, running at a high velocity. The friction clutch mechanism admits of the machine gradually picking up its speed, and this without any slippage of the belt, and the detriment to the belt that this involves, besides the need of side flanges on the pulley, or other device to hold the belt from running off while the machine is getting up speed.

The device is also useful for maintaining uniformity of operating speed, even though the speed of the main shaft varies, and may therefore be employed for the transmission of rotary motion to a dynamo from an irregularly running motor, such as a gasolene engine.

Having thus described my invention, I claim:—

1. In a variable speed driving device, the combination with a rotating shaft, of a friction wheel fixed thereto, a loose pulley adjacent to the friction wheel, radially movable centrifugal arms attached to said pulley, friction shoes on said arms to engage the friction wheel, springs tending to bring the friction parts into engagement, levers connecting with said springs, a sliding connection with said levers mounted on the shaft, and a shift-lever connected with said sliding device, substantially as and for the purpose set forth.

2. In combination with a rotary shaft, a variable speed driving device, comprising a friction wheel fixed to the shaft, a loosely mounted pulley adjacent thereto, radially movable arms connected with said pulley, with friction shoes to bear on the friction wheel, counteracting springs operating against centrifugal action, levers adapted to vary the tension of said springs, a sliding sleeve on the shaft, links connecting said sleeve with said levers, a shift lever for the sleeve, and means for holding said lever at any desired point.

In testimony whereof I affix my signature in presence of two witnesses.

CHAS. P. STRITE.

Witnesses:
J. M. ST. JOHN,
N. E. NEMECEK.